No. 765,492. PATENTED JULY 19, 1904.
C. L. KNOWLTON.
LAWN MOWER SHARPENER.
APPLICATION FILED JUNE 11, 1903.
NO MODEL.
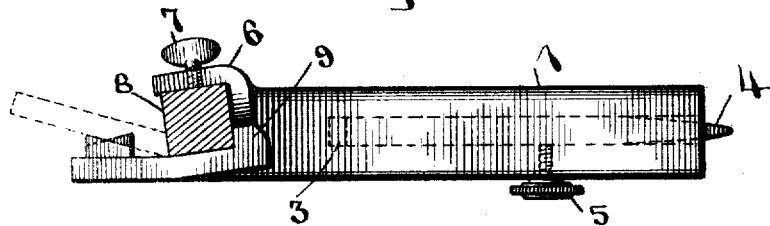
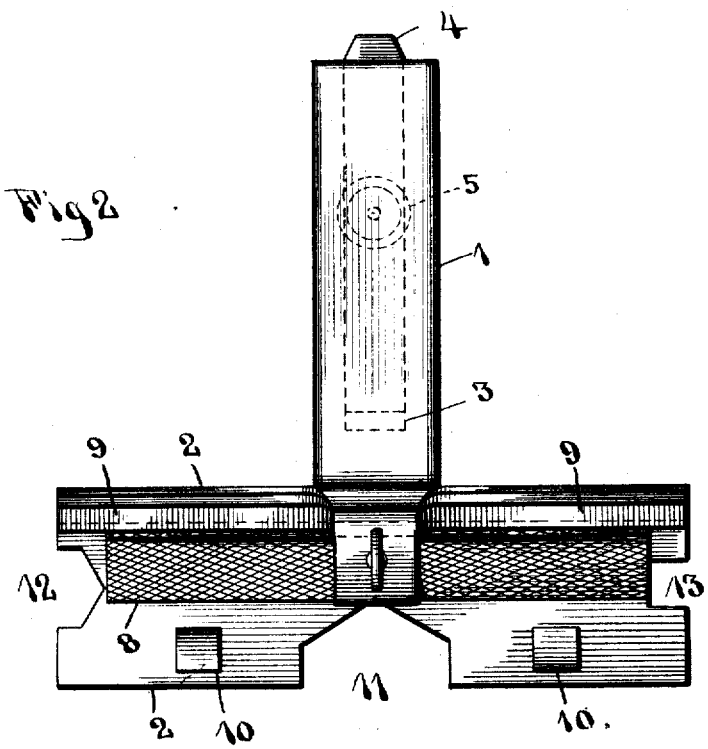
WITNESSES:
F. J. Hartman
Edw. W. Vaill Jr.
INVENTOR
George L. Knowlton
BY
ATTORNEY.

No. 765,492. Patented July 19, 1904.

UNITED STATES PATENT OFFICE.

GEORGE L. KNOWLTON, OF PHILADELPHIA, PENNSYLVANIA.

LAWN-MOWER SHARPENER.

SPECIFICATION forming part of Letters Patent No. 765,492, dated July 19, 1904.

Application filed June 11, 1903. Serial No. 161,103. (No model.)

*To all whom it may concern:*

Be it known that I, GEORGE L. KNOWLTON, of Philadelphia, Pennsylvania, have invented certain new and useful Improvements in Lawn-Mower Sharpeners, of which the following is a full, clear, and complete disclosure.

My invention comprises an improved means for sharpening the blades or knives of lawn-mowers, and may have in addition several recesses which serve as wrenches of different sizes to fit all the nuts usually found in the construction of lawn-mowers and a screw-driver which may be inclosed when not in use.

The object of my invention is to increase efficiency, durability, and adaptability of the device above mentioned.

For a full, clear, and exact description of my invention reference may be had to the following specification and to the accompanying drawings, forming a part thereof, in which—

Figure 1 is a side elevation of my device, and Fig. 2 a plan view of the same.

Referring to the drawings, my device consists of a T-shaped casting or body portion comprising a handle 1 and a cross-piece or base 2. The handle 1 is provided with a recess 3, within which a screw-driver blade 4 is adapted to slide. Said screw-driver blade is retained in different positions within the recess by a thumb-screw or similar means 5. The handle 1 is joined to the cross-piece 2 at its middle and is also provided with a projection 6, which extends from the upper side of said handle over the part 2. Said projection is provided with a thumb-screw 7, which is adapted to engage at its inner end with a file or other abrading device 8. The file 8 is preferably provided with four cutting or abrading surfaces, so that they may be used successively as they become worn or mutilated. If abrading material such as emery or corundum is used it is obvious that all sides will be capable of use in sharpening.

The cross portion or base 2 is provided with flanges 9, which hold the file in position transversely thereon. The cross-piece 2 is also provided with lugs or bosses 10, which are inclined at their outer end at slightly-different angles in relation to each other to conform to the curve or helical shape of a lawn-mower blade and are adapted in connection with the file itself to form guides whereby the file may be easily and accurately guided along the edge of the cutting-blade when the same is being sharpened or ground. The cross-piece 2 may be also provided with recesses 11, 12, and 13, which are adapted to fit the different nuts which are required to be adjusted at different times while the lawn-mower is being used.

It is apparent by the consideration of the construction above described that I have produced an instrument or tool which may be used to sharpen a lawn-mower without the necessity of removing the cutting-blades from the machines and without the necessity of using complicated and delicate machinery.

I do not wish to be limited to the exact details of form and arrangement of parts herein set forth, for changes may be made therein without departing from the spirit and scope of my invention; but

What I claim, and desire to protect by Letters Patent of the United States, is—

1. A tool for sharpening lawn-mowers, consisting of a handle portion having a base-piece extending from one end thereof, a projection extending from the same end of said base-piece, an abrading device situated between said base-piece and projection and resting against said handle portion, a securing device passing through said projection and engaging said abrading device to hold the same in position, and guides upon the side of said base-piece adjacent said abrading device adapted to contact with one face of a lawn-mower blade.

2. A tool for sharpening lawn-mowers, consisting of a handle portion, an abrading device carried thereby, a base-piece extending from the end of said handle portion and beyond said abrading device, and guides upon the projecting portion of said base-piece on the side thereof adjacent said abrading device, said abrading device, base-piece and guides being so located that when the edge of the lawn-mower blade contacts with said abrading device and rests upon said guides, it will contact with said base-piece to be guided thereby.

3. A tool for sharpening lawn-mowers, comprising a body portion, an abrading device carried thereby, a base-piece projecting beyond said abrading device, and guide-lugs mounted upon the projecting portion of said base-piece on the side thereof adjacent abrading device, said guide-lugs being inclined in opposite directions so as to conform to the contour of a lawn-mower blade on the side thereof opposite the side edge in contact with the abrading device.

4. A tool for sharpening lawn-mowers having an abrading device secured thereto, and a plurality of guide-faces adapted to engage one side only of a lawn-mower blade, said guide-faces being inclined in different directions to conform to the contour thereof.

In witness whereof I hereunto set my hand this 8th day of June, A. D. 1903.

GEORGE L. KNOWLTON.

Witnesses:
JOHN F. GRADY,
CHAS. K. BENNETT.